(12) United States Patent
Hammond

(10) Patent No.: US 9,047,683 B2
(45) Date of Patent: Jun. 2, 2015

(54) METHOD AND APPARATUS FOR RESAMPLING A SPATIALLY SAMPLED ATTRIBUTE OF AN IMAGE

(75) Inventor: Keith Hammond, Chelmsford Essex (GB)

(73) Assignee: SNELL LIMITED, Reading, Berkshire (GB)

( * ) Notice: Subject to any disclaimer, the term of this patent is extended or adjusted under 35 U.S.C. 154(b) by 54 days.

(21) Appl. No.: 13/809,205

(22) PCT Filed: Jul. 11, 2011

(86) PCT No.: PCT/GB2011/051295
§ 371 (c)(1),
(2), (4) Date: Feb. 6, 2013

(87) PCT Pub. No.: WO2012/004615
PCT Pub. Date: Jan. 12, 2012

(65) Prior Publication Data
US 2013/0129257 A1 May 23, 2013

(30) Foreign Application Priority Data
Jul. 9, 2010 (GB) .................................. 1011603.6

(51) Int. Cl.
*G06K 9/32* (2006.01)
*G06T 3/40* (2006.01)
*H04N 7/01* (2006.01)

(52) U.S. Cl.
CPC . *G06T 3/403* (2013.01); *G06T 3/40* (2013.01); *G09G 2340/0407* (2013.01); *H04N 7/0102* (2013.01); *H04N 7/0117* (2013.01)

(58) Field of Classification Search
None
See application file for complete search history.

(56) References Cited

U.S. PATENT DOCUMENTS

| | | | | |
|---|---|---|---|---|
| 5,440,653 A * | 8/1995 | Greggain et al. | ............. | 382/298 |
| 7,437,018 B1 * | 10/2008 | Amirghodsi | .................. | 382/293 |
| 8,811,773 B2 * | 8/2014 | Tezuka | ........................ | 382/298 |
| 2002/0159648 A1 | 10/2002 | Alderson et al. | | |
| 2004/0056874 A1 | 3/2004 | Macinnis et al. | | |
| 2004/0264799 A1 | 12/2004 | Gallagher et al. | | |
| 2010/0026887 A1 | 2/2010 | Sole et al. | | |
| 2010/0150475 A1 | 6/2010 | Holland | | |

FOREIGN PATENT DOCUMENTS

| | | |
|---|---|---|
| JP | 2003-125417 | 4/2003 |
| WO | WO 2009/138804 | 11/2009 |

OTHER PUBLICATIONS

Great Britain Search Report for GB 1011603.6, dated Oct. 7, 2010.

(Continued)

*Primary Examiner* — Andrae S Allison
(74) *Attorney, Agent, or Firm* — Pearl Cohen Zedek Latzer Baratz LLP

(57) ABSTRACT

Resampling a spatially sampled attribute of an image, for example up- or down-conversion, in which contributions to a symmetrical FIR resampling filter from positions outside the image—that is to say where the filter aperture extends beyond an image edge—are obtained by copying values from positions inside the image. This can conveniently be done by modifying filter coefficients.

12 Claims, 7 Drawing Sheets

(56) References Cited

OTHER PUBLICATIONS

Anonymous, "Programming in Java Advanced Imaging," Sun Microsystems, Chapter 7, pp. FP and 191-200, Release 1.0.1, Nov. 1999; retrieved from: http://docs.oracle.com/cd/E19957-01/806-5413-10/806-5413-10.pdf.

PCT International Search Report for PCT International Application No. PCT/GB2011/051295, dated Dec. 13, 2011.

* cited by examiner

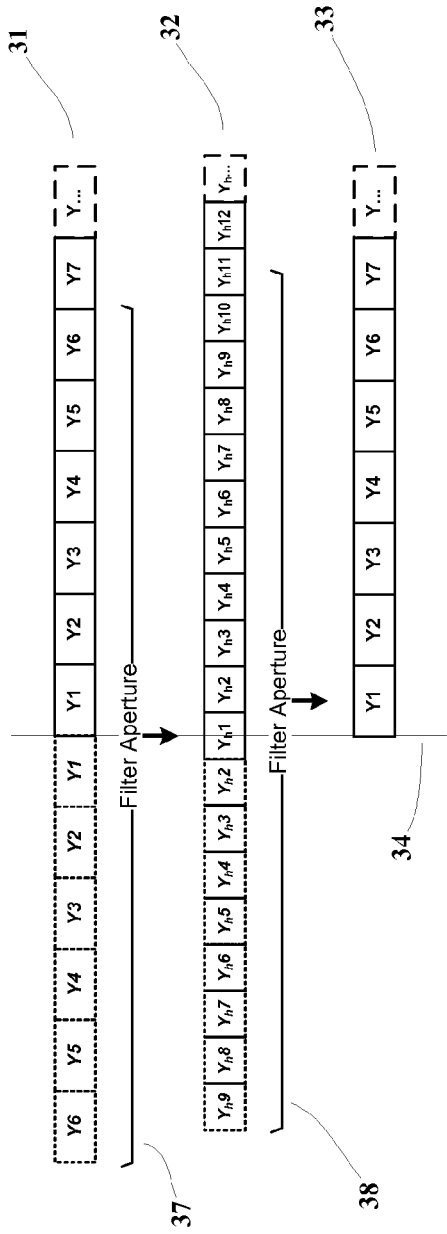
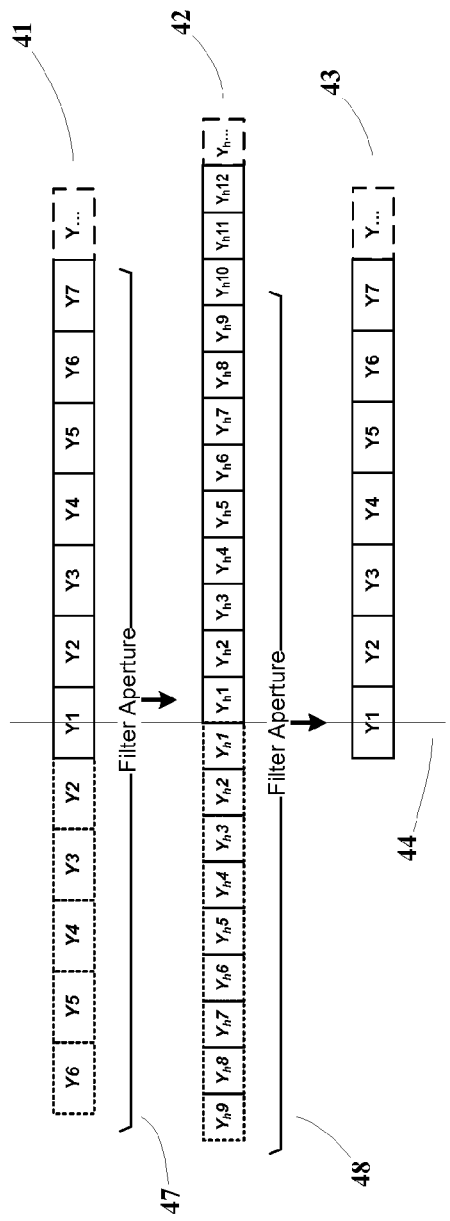
Figure 3
Figure 4

METHOD AND APPARATUS FOR RESAMPLING A SPATIALLY SAMPLED ATTRIBUTE OF AN IMAGE

CROSS-REFERENCE TO RELATED APPLICATIONS

This application is a National Phase Application of PCT International Application No. PCT/GB2011/051295, International Filing Date Jul. 11, 2011, claiming priority of Great Britain Patent Application No. GB 1011603.6, filed Jul. 9, 2010, which is hereby incorporated by reference in its entirety.

FIELD OF INVENTION

This invention concerns rescaling of images.

BACKGROUND OF THE INVENTION

When images are to be stored or processed electronically they are almost always spatially sampled as an array of picture elements or pixels. The number of pixels chosen to represent an image will depend on the required spatial resolution, but is usually limited by practical constraints of processing speed, complexity or available data storage and transmission capacity. In television it is common to use different numbers of pixels to represent the luminance of the image and the chrominance of the image. The well-known ITU-R recommendation 601 for sampling television images includes the so-called 4:2:2 sampling structure in which chrominance information is sampled at half the horizontal spatial frequency of the luminance sampling, and chrominance samples are co-sited with horizontally-alternate luminance samples.

It is often necessary to convert a sampled image from one sampling structure to another. Many different television display formats have been developed; conversion between standard-definition and high-definition television formats is a common problem to be solved, and this usually involves changing both the horizontal and the vertical sampling frequency. If such conversions can be made without introducing any distortion of the image, then an image can be processed at any convenient resolution; and, the combination of images having different resolutions, for example in a video editing or production process, is greatly simplified.

International Patent application WO 2009/138804 describes methods of up-sampling image data, so that it is represented by a higher number of samples, and then down-sampling the result to obtain the original samples without loss or distortion. This is achieved by 'reversible', finite impulse response (FIR) resampling filters. Suitable filters for conversion between standard-definition and high-definition television formats may have a 'filter aperture' of 16 samples. This means that 16 input samples are used to construct each output sample; and, any input sample will contribute to an image region 16 input samples wide. In the case of up-conversion, 16 input samples will correspond to a larger number of output samples. Therefore, the up-converted image will be surrounded by a wide 'border' of non-zero samples situated outside the edge of the original image.

This is illustrated in FIG. 1 which shows known up-conversion followed by known down-conversion. For simplicity the Figure shows a filter aperture 12 low-resolution samples wide. Although spatial samples are usually considered mathematically as 'delta functions' having infinitely small spatial extent, the array of pixels that represents an image is often represented as a tessellating set of polygons where the centre of each polygon corresponds to a spatial sampling point. Orthogonal sampling structures are typical and the pixels are notionally rectangular; and, in many preferred image sampling systems, they are square. In the figure the samples are represented by rectangles in which the centre of each rectangle corresponds to the sampling point. The figure illustrates one-dimensional sampling, and so the height of the rectangles is arbitrary.

A sequence of low-resolution samples (1) is to be up-converted to a sequence of higher-resolution samples (2), and then reversibly down-converted to a sequence of low-resolution samples (3) that are identical with the original low-resolution samples (1). The samples represent some spatial attribute of an image, for example luminance values for pixels. Let us assume that the sequence of samples represents the start of a television line; and, the line (4) in the figure represents the position of the left-hand edge of the sampled image.

The required sampling frequency and phase of the higher resolution samples (2) is assumed to be arbitrarily defined, and therefore there is no fixed relationship between the positions of low-resolution samples and the positions of high-resolution samples.

If the up-conversion is to be reversed according to the principles described in the above-referenced patent application, then all higher-resolution samples that receive a contribution from an input sample must be available to the down-conversion filter. The higher resolution samples (2) will be created by an FIR up-sampling filter that forms output samples from a weighted sum of input samples that fall within a filter aperture centred on the position of the required output sample. In the figure the up-conversion filter aperture is assumed to be 12 low-resolution samples wide and its position when creating the first higher-resolution output sample is shown by the brace (5). The illustrated position is the earliest position that includes a low-resolution input sample; if the filter aperture were moved one higher-resolution sample pitch to the left, then no input samples would fall within the filter aperture. Thus, in the illustrated example, an additional 9 higher-resolution samples, numbered $Y_h1$ to $Y_h9$ and situated outside the image boundary, have been created. A similar situation arises at the opposite image edge (the right-hand edge, not shown in the Figure) where up-converted samples must continue to be generated until the filter aperture no longer includes any input samples.

We will now consider the down-sampling process. The re-creation of the first lower-resolution sample from the set of higher-resolution samples (2) by an FIR down-sampling filter is shown by the brace (6). According to the teaching of the above referenced patent application, which is hereby incorporated by reference, it is advantageous for the aperture of the down-sampling filter to be identical to the aperture of the up-sampling filter; the figure therefore shows identical aperture widths. As can be seen from the figure, the additional 9 samples lying outside the image are required to reconstruct the first lower-resolution sample of the set (3). And, additional samples will be required to construct samples at the right-hand image edge (not shown in the Figure).

If these 'border' samples outside the image area were discarded it would be impossible to reverse the up-sampling without loss or distortion. It is thus necessary to process more samples than the number corresponding to the size of the up-converted image, if reversibility is to be maintained. The number of additional samples depends on the conversion ratio as well as the filter aperture; thus it may not always be possible to know how many additional samples should be stored. In real-time video processing, the number of extra samples may be more than can be processed in the available horizontal and vertical 'blanking intervals' between lines and fields or frames.

These difficulties of prior-art resampling systems can be solved by embodiments of the present invention.

SUMMARY OF THE INVENTION

The invention consists in a method and apparatus for resampling a spatially sampled attribute of an image in which contributions to a symmetrical FIR resampling filter from positions outside the image are obtained by copying values from positions inside the image wherein the said positions inside the image and the respective said positions outside the image are equidistant from an image edge.

Suitably, the said positions inside the image and the respective said positions outside the image are separated by an odd number of filter-input sample pitches.

Alternatively, the said positions inside the image and the respective said positions outside the image are separated by an even number of filter-input sample pitches.

In certain embodiments at least one of a plurality of sampled constituent images that respectively represent different attributes of a common image at different respective spatial sampling frequencies is rescaled.

Advantageously, an image having a width or height of N sample pitches is represented by N+1 rows or columns respectively of samples so that opposite image edges lie on sample positions.

In one embodiment, the value of an image-edge sample input to a resampling filter is set to zero.

In a preferred embodiment, the value of an image-edge sample input to a resampling filter is derived from the values of neighbouring input samples falling within the aperture of that resampling filter.

Advantageously, the value of an image-edge sample input to a resampling filter is determined from a required ratio of the value of the said input sample value to the value of the corresponding co-located filter output sample.

Suitably, the value of the said ratio is substantially equal to unity.

In a preferred embodiment, the value of the said ratio is less than unity.

Alternatively, the value of an image-edge sample input to a resampling filter is chosen so that the value of the corresponding co-located filter output sample is zero.

Advantageously, filter coefficients that weight contributions from positions inside the image are modified so as to include required contributions from outside the image whenever the aperture of the said resampling filter extends beyond the image edge.

In some embodiments the contribution of an image-edge sample to a resampling filter is replaced by augmented contributions from other samples within the filter aperture.

BRIEF DESCRIPTION OF THE DRAWINGS

An example of the invention will now be described with reference to the drawings in which:

FIGS. 2 to 5 show up- and down-sampling of image data according to exemplary embodiments of the invention.

DETAILED DESCRIPTION OF THE INVENTION

Figure 1:
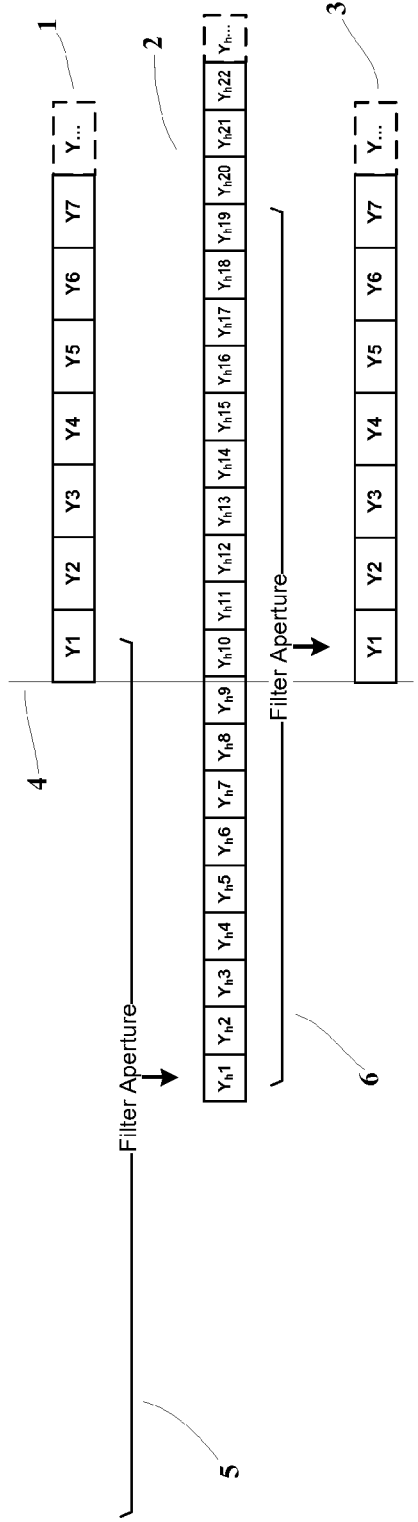
FIG. 1 shows up- and down-sampling of image data according to the prior art.
Figure 2:
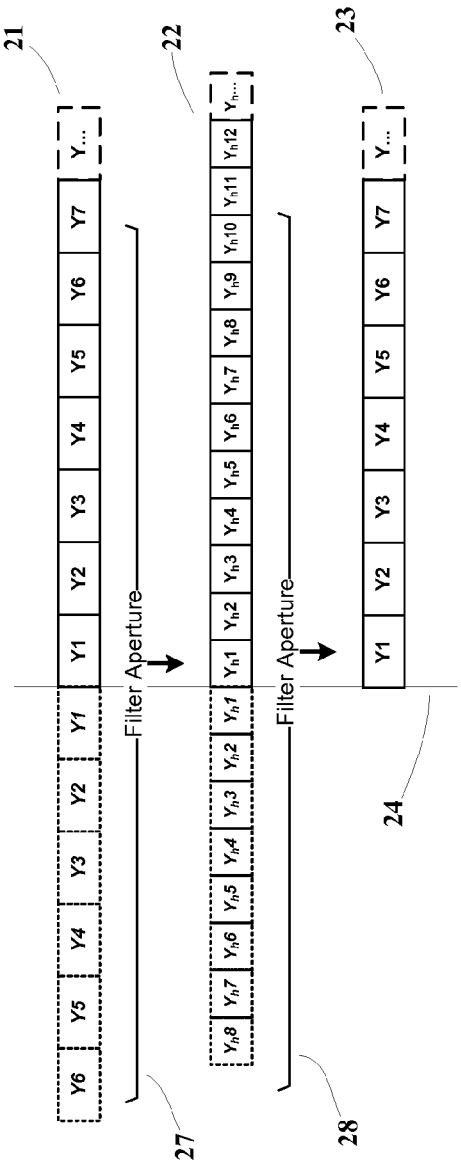

FIG. 2 shows reversible up- and down conversion, between the same sampling frequencies as FIG. 1, according to an embodiment of the invention. The set of lower-resolution samples (21) have been 'reflected' about the image edge position (24) so as to create copies of the samples Y1 to Y6, designated Y1 to Y6, where the position of each respective copied sample is the same distance from the image edge position (24) as the respective original sample.

The phase of the higher-resolution sampling structure relative to the lower-resolution sampling structure has been modified so that a point half-way between two higher resolution samples corresponds with the edge position (24) of the lower-resolution image. The resulting up-sampling filter aperture position, that creates the first sample of the higher-resolution set (22) that is within the image area, is shown by the brace (27). This aperture position differs from the position (5) of FIG. 1 in that the first sample to be computed lies within the image. The necessary contributions from positions outside the image are obtained from the 'reflected' samples Y6 to Y1.

The inventor has appreciated that, if the resampling filter is symmetrical, and the filter-input image information is symmetrical about the image edge, then the re-sampled filter-output image information will also be symmetrical about the image edge. This avoids the need to store additional sample values for samples outside the image, as will be further explained below.

A symmetrical resampling filter means a filter whose coefficients are symmetrical about the position of its output when all possible phase relationships between input and output samples are considered. Thus if the filter coefficients are defined on a super-sampled structure that includes all input samples and all output samples, they will be symmetrical. The particular set of coefficients that are used to calculate a particular output sample will typically not be symmetrical, because of the arbitrary phase relationship between the input and output sampling structures.

Because the values of the higher-resolution samples (22) lying outside the image that would be computed from the reflected lower-resolution input samples are symmetrical about the edge position (24), there is no need to compute, or store these values. Values for these samples can be obtained by copying values from symmetrically-located samples within the image. This, of course, also applies to the right-hand image edge, not shown in the Figure.

Let us now consider the down-sampling process that recovers a set of lower-resolution samples (23) from the up-converted samples (22). The position of the down-sampling filter aperture that computes the first lower-resolution sample is shown by the brace (28). The higher-resolution samples that fall within this aperture are: samples $Y_h 8$ to $Y_h 1$ from outside the image; and samples $Y_h 1$ to $Y_h 10$ from inside the image. Note that although the aperture position (28) is identical to the aperture position (6) in FIG. 1, it includes one less input sample; this is because of the phase shift of the higher-resolution sample structure (22) that aligns the mid-point between two higher-resolution samples on the image edge (24).

The higher-resolution sample values from outside the image that are necessary to compute the values of the down-sampled samples (23) can be obtained by copying sample values from positions within the image. Therefore, a re-sampled representation of an image attribute can be reversibly returned to a previous, lower resolution without the need to store more sample values than correspond to the size of the image.

An alternative to the system of FIG. 2 is shown in FIG. 3. In this alternative the phase of the higher-resolution samples (32) is adjusted so that the image edge position (34) corresponds with a higher-resolution sample position. In both the up- and the down-conversion, sample values from outside the image area are derived by reflection. In the up-conversion low-resolution input samples are reflected about a position mid-way between two input samples (as was the case in FIG. 2); and, in the down-conversion, the reflection is about the position of the higher-resolution sample $Y_h1$. The two reflection points are spatially coincident.

A further alternative is shown in FIG. 4. In this alternative the lower-resolution samples (41) are reflected about the position of the first lower-resolution sample Y1; and, the sampling phase of the higher-resolution samples is adjusted so that a point half of one high-resolution sample-pitch to the left of the first higher-resolution sample $Y_h1$ corresponds with the reflection point. Again the two reflection points are spatially coincident.

Figure 5:
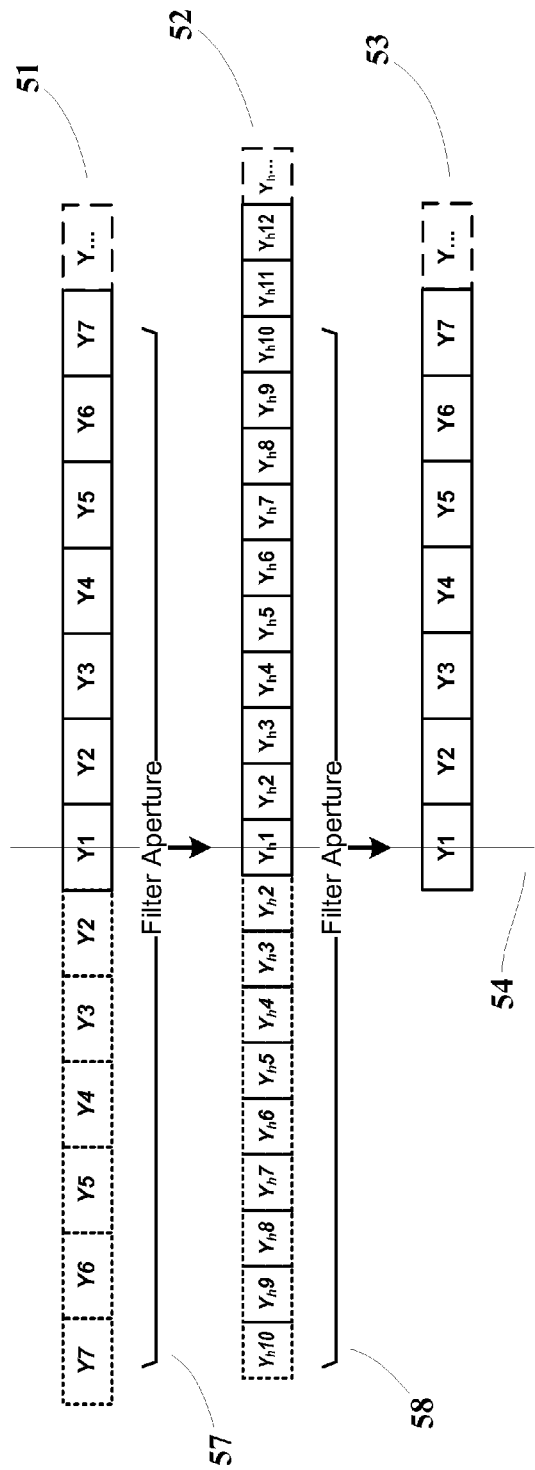

A fourth alternative is shown in FIG. 5. In this alternative the sampling phase of the higher-resolution samples is adjusted so that the first higher-resolution sample is co-sited with the first lower-resolution sample; and both the lower-resolution samples and the higher-resolution structures are reflected about this first sample position.

As can be seen from FIGS. 2 to 5, there are two ways of reflecting samples about an image edge that enable sample values for positions outside the image to be obtained by copying the values of samples within the image. In the first case the reflection is about a position mid-way between adjacent samples, and the sequence of sample values input to a rescaling filter is:

... *Y5 Y4 Y3 Y2 Y1* Y1 Y2 Y3 Y4 Y5 ...

and it can be seen that the distance between the position of each copied sample and the respective sample from which the value is copied is an odd number of input sample pitches.

In the second case the reflection is about a sample point, and the sequence of sample values input to a rescaling filter is:

... *Y5 Y4 Y3 Y2* Y1 Y2 Y3 Y4 Y5 ...

Where (in each case) the italicised samples lie outside the image, and their values are copied from the respective reflected samples within the image.

In this second case the distance between the position of each copied sample and the respective sample from which the value is copied is an even number of input sample pitches.

Either method may be applied to either the lower-resolution samples or to the higher-resolution samples. And, the reflection point must be co-sited in the input and output sample structures. Typically it is an image edge point beyond which no image attribute information available or required; and, reflection is applied at two opposing edges of the image.

In many image processing applications different attributes of a common image are represented at different sampling resolutions. The previously-mentioned ITU-R Recommendation 601 4:2:2 sampling structure for luminance and chrominance is a common example, where the chrominance horizontal sampling frequency is half that for luminance. The resampling, by a common factor, of such constituent images representing different attributes of a common image poses particular difficulties because of the need to maintain the spatial relationship between the samples that represent different image attributes. These difficulties may be overcome by the methods of the invention as will now be explained with reference to FIGS. 6 to 8.

Figure 6:
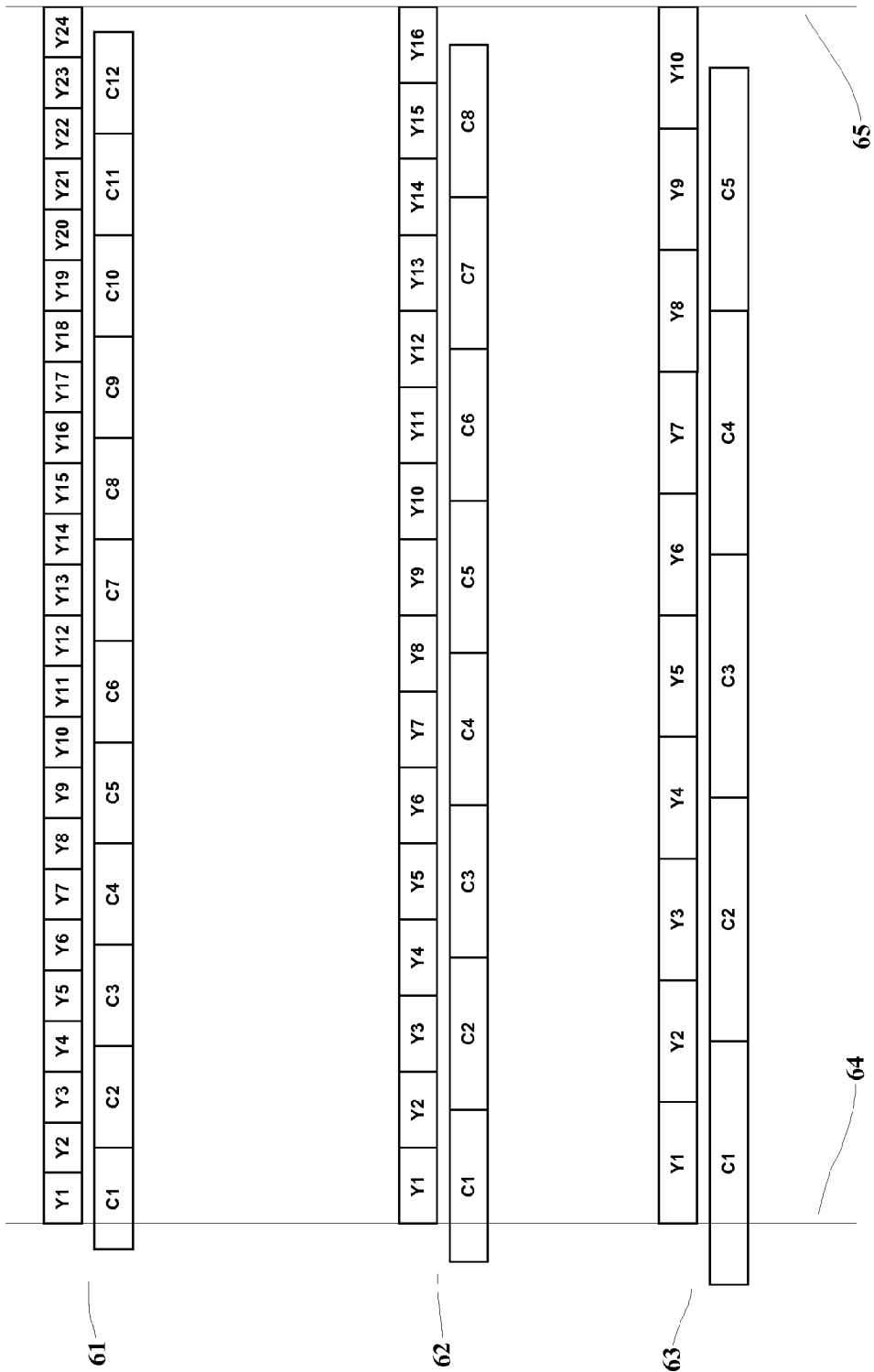
FIG. 6 shows prior art horizontal chrominance and luminance sampling structures at three different sampling resolutions for an exemplary television line.

FIG. 6 shows horizontal chrominance and luminance sampling structures at three different sampling resolution for an exemplary television line. The structure (61) has the highest horizontal resolution, the structure (62) has lower horizontal resolution, and the structure (63) has the lowest horizontal resolution. For each structure the chrominance samples are shown below the luminance samples for clarity; typically the chrominance structure would be vertically-aligned with the corresponding luminance structure. Only one luminance line and one chrominance line is shown for each structure; of course a practical image sampling system would include many such lines. The numbers of samples per line have been made very small so as to make the structure easy to appreciate. As for typical sampling structures according to ITU-R Recommendation 601, there is an even number of luminance samples per line and chrominance samples are co-sited with odd numbered luminance samples.

The first structure (61) has 24 luminance samples per line numbered Y1 to Y24; and 12 chrominance samples numbered C1 to C12.

The second structure (62) has 16 luminance samples per line numbered Y1 to Y16; and 8 chrominance samples numbered C1 to C8.

The third structure (63) has 10 luminance samples per line numbered Y1 to Y10; and 5 chrominance samples numbered C1 to C5.

The three illustrated structures have been horizontally aligned so that the positions of the left and right edges of the luminance images correspond. The positions of the left and right edges of the luminance images are indicated by the lines (64) and (65). In all three structures the luminance image edge lies on the edge of a luminance sample; that is to say that, if the sampling structure is extended beyond the image edge, then the image edge is situated exactly mid-way between two luminance sample positions. Thus, when converting between these three structures, it is easy to derive required luminance filter contributions from outside the image area by 'reflecting' pixels about the image edge position.

However, it can be seen from FIG. 6 that the position of the chrominance image is always horizontally offset from the luminance image; and, the amount of offset differs (as a proportion of the image width) in the three different sampling structures. The magnitude of the offset is half of one luminance sample pitch. Because the sampling pitch differs in the three structures, the offset also differs.

Because of this differing offset it is not possible to choose a chrominance image edge reflection point that is co-located in all structures and lies on a chrominance sample or half-way between two chrominance samples. At least some additional chrominance edge samples must be stored and processed so as to convert reversibly between these structures.

However, it is still possible to use the above-described methods for reversibly converting between differently-scaled representations of the same image with minimal or zero storage or processing of pixels lying outside the image area if one or more of the constituent sampling structures is modified. Suitable exemplary methods will now be described.

Figure 7:
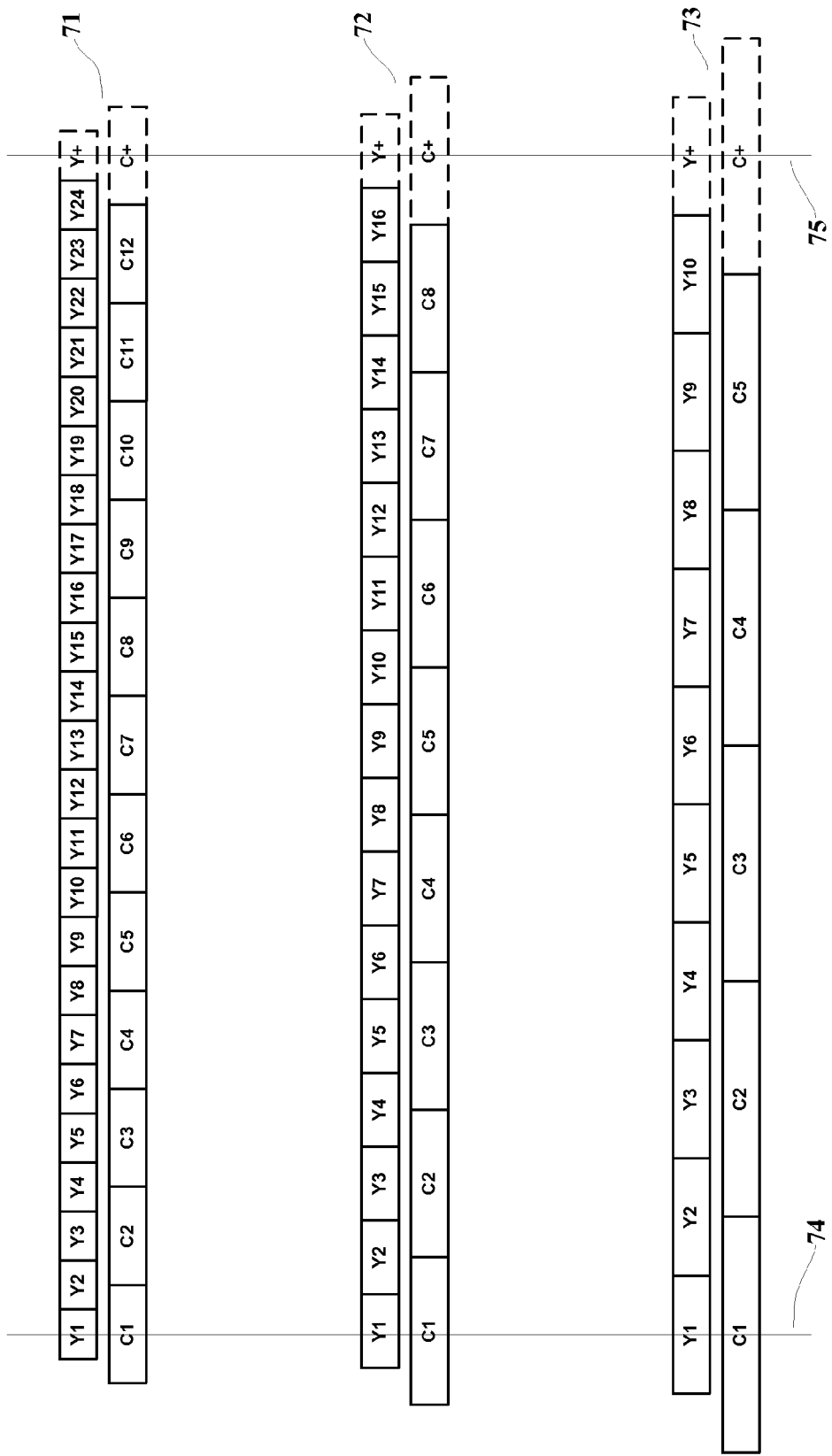
FIG. 7 shows modified horizontal chrominance and luminance sampling structures at three different sampling resolution for an exemplary television line according to an embodiment of the invention.

FIG. 7 shows modified versions of the sampling structures of FIG. 6. All three structures have been modified by adding an additional luminance sample Y+ and additional chrominance sample C+ to the right-hand end of each line. At first sight it would appear that adding additional samples to each line is not permissible because it would change the number of samples per picture width. This cannot be changed because the objective is to convert between standardised image resolutions having defined numbers of samples per line.

However, the inventor has appreciated that an image having a defined width (or height) of N sample pitches can be represented by N+1 samples, where the image side (or top, respectively) edges coincide with sample positions. Therefore, if the left image edge is defined to be at the centre of the first sample, and the right image edge is defined to be at the centre of the (extra) last sample, then the width of the image, as measured in sample pitches, is unchanged by the addition of the extra sample. In FIG. 7 the image edges correspond to the lines (74) and (75), and it can be seen that: the structure (71) has a width of 24 luminance samples and 12 chrominance samples; the structure (72) has a width of 16 luminance samples and 8 chrominance samples; and, the structure (73) has a width of 10 luminance samples and 5 chrominance samples. These widths are identical to the structures of FIG. 6 even though an additional luminance sample and an additional chrominance sample has been added to each line. The addition of the extra samples has eliminated the half-luminance-sample-pitch asymmetry between the luminance and chrominance structures.

Conversion between three structures of FIG. 7 can be achieved by the method previously described. When computing the values of pixels close to the image edge, pixels inside the image are reflected to positions outside the image that lie within the appropriate filter aperture; the axis of reflection being centred on the (left or right as appropriate) end pixel of the line.

This process will, of course, require that the values of one additional luminance sample and one additional chrominance sample per line are stored and processed. However, this is considerably less than the number of additional samples that would need to be processed if all pixels outside the image area falling within the respective rescaling filter aperture had to be stored and processed.

Figure 8:
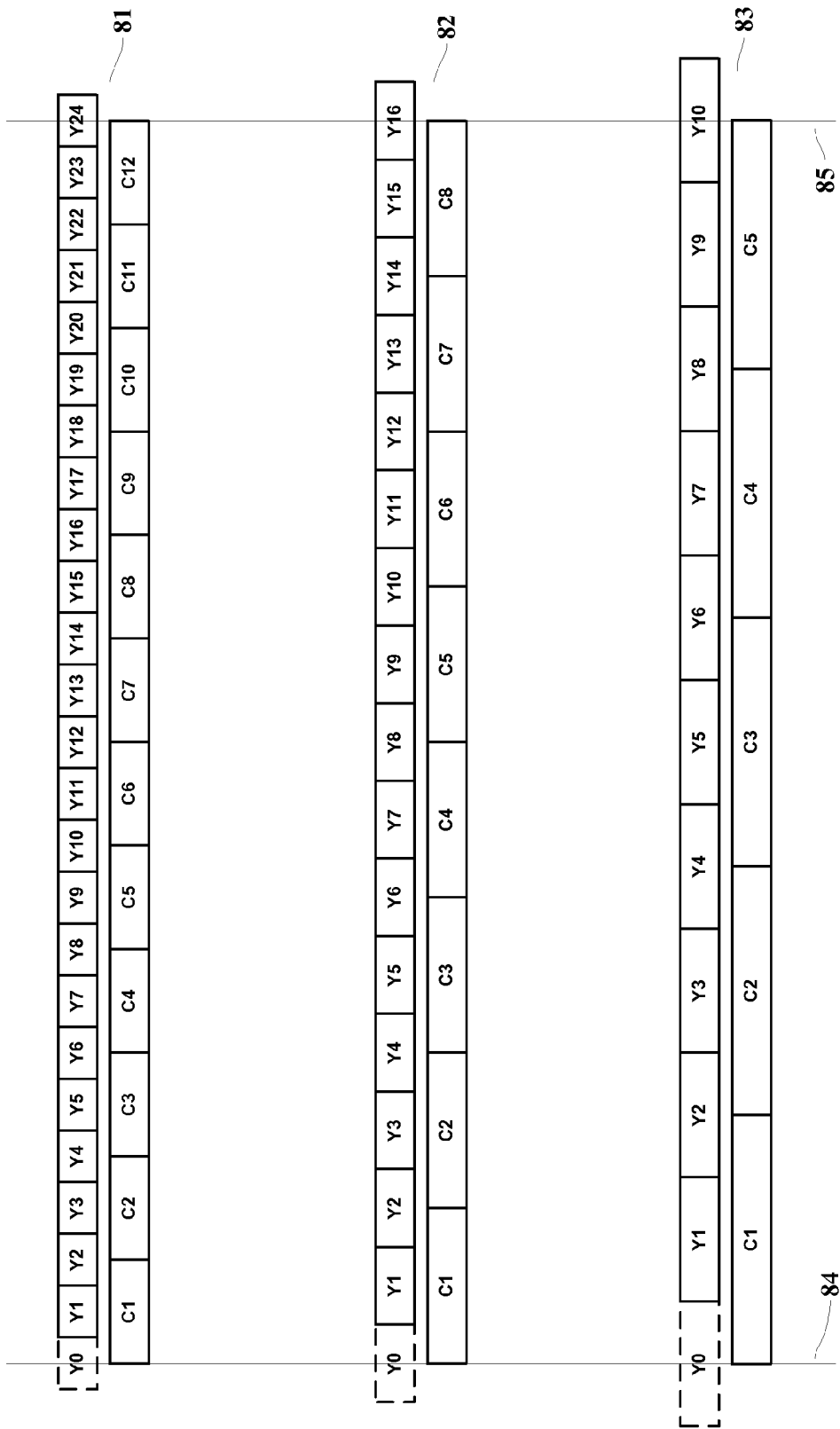
FIG. 8 shows modified horizontal chrominance and luminance sampling structures at three different sampling resolution for an exemplary television line according to an alternative embodiment of the invention.

A further improved set of three sampling structures is shown in FIG. 8. These structures have been derived from the respective structures of FIG. 6 by adding one additional luminance sample at the start of each line; the chrominance structures are identical with those of FIG. 1. The positions of the image edges are indicated by the lines (84) and (85). As for the structures illustrated in FIG. 7, the luminance image edges coincide with luminance sample positions, and therefore the luminance edge regions can be reflected about the respective end samples to obtain any required filter contributions from outside the image area.

The chrominance structures in FIG. 8 can also be reflected about the image edges because the image edges correspond with sample edges; that is to say they correspond with points that are half-way between samples if the sampling structure is extended outside the image. The sequence of chrominance samples at the start of a line that would be input to a resampling filter is:

... *C3* *C2* *C1* C1 C2 C3 ...

And, the sequence of luminance samples at the start of a line is:

... *Y5* *Y4* *Y3* *Y2* *Y1* Y0 Y1 Y2 Y3 Y4 Y5 ...

Where:
  Y0 is the additional sample; and
  the values of italicised samples are copied from respective reflected samples.

The improved structures of FIG. 8 only require one additional sample per line, the luminance sample Y0, to be stored and processed. Even this small additional resource requirement may be inconvenient, and a way of eliminating it will now be described.

Let us consider the up-conversion of the additional sample Y0 in a low-resolution image to the corresponding, co-sited additional sample Y0 in a higher-resolution image by means of a symmetrical, one-dimensional FIR filter.

To simplify the notation:
  Let the value of Y0 in the low-resolution image be L; and, the value of Y0 in the high resolution image be H.

The up-sampling filter will form H from a weighted sum of L and the values of a number of other neighbouring luminance samples in the low-resolution image falling within the filter aperture. This can be expressed as:

$$H = K_U \cdot L + B_U \quad [1]$$

Where: $K_U$ is the value of the centre coefficient of the up-sampling filter; and,
  $B_U$ is the total contribution to H of the other neighbouring luminance samples in the low-resolution image falling within the filter aperture.

One, potentially attractive, idea is to ensure that the value of H is zero; then its contribution need not be considered when down-sampling.

Setting H to zero in equation [1] gives:

$$0 = K_U \cdot L + B_U$$

$$L = -B_U \div K_U \quad [2]$$

Thus, at the time of up-conversion, we can use equation [2] to compute the value of L that ensures that the value of H is zero. This value of L would be used whenever L falls within the up-sampling filter aperture.

A different option is to ensure that L is zero so that its contribution need not be considered when up-sampling. The down-sampling filter will form L from a weighted sum of H and the values of a number of other neighbouring luminance samples in the high-resolution image falling within the filter aperture. This can be expressed as:

$$L = K_D \cdot H + B_D \quad [3]$$

Where: $K_D$ is the value of the centre coefficient of the down-sampling filter; and,
  $B_D$ is the total contribution to L of the other neighbouring luminance samples in the high-resolution image falling within the filter aperture.

Setting L to zero in equation [3] gives:

$$0 = K_D \cdot H + B_D$$

$$H = -B_D \div K_D \quad [4]$$

Thus, alternatively, at the time of down-conversion, we can use equation [4] to compute the value of H that ensures that the value of L is zero, and use this value whenever H falls within the down-sampling filter aperture.

However, there is a third alternative, which is to define the ratio between H and L so that:

$$H = P \cdot L \quad [5]$$

Where: P is a constant.

Substituting equation [5] into equation [1]:

$$P \cdot L = K_U \cdot L + B_U$$

$$(P - K_U) \cdot L = B_U \quad [5]$$

$$L = B_U \div (P - K_U) \quad [6]$$

Therefore, when up-sampling, if we set a value for P, there is no need to have a stored value of L to input to the up-sampling filter. The required value can be calculated from $B_U$, which is the partial filter output due to known, input pixel values; and, $K_U$, which is a known filter coefficient.

A similar approach can be used when down-sampling. Substituting equation [3] into equation [5]:

$$H = P \cdot (K_D \cdot H + B_D)$$

$$H \cdot (1 - P \cdot K_D) = P \cdot B_D$$

$$H = P \cdot B_D \div (1 - P \cdot K_D) \quad [7]$$

There is thus no need have a stored value for H. The required value can be calculated from known, input pixel values and filter coefficients. Of course, the previously described options of setting either H or L to zero are special cases where P is either zero or infinite, respectively.

The definition of the relationship between the additional pixels in the differently-scaled versions of the image does not impair the reversibility of the conversion, the reversibility is due to the properties of the resampling filters and the filter coefficients have not been modified in any way.

The additional pixel will have some effect at the edge of the image. Whatever its value, it will affect other samples near the edge of the image by virtue of its contribution to the resampling filters. If it is very different from its neighbours it will add high spatial frequency energy that may cause the resampling filter to 'ring'. It is therefore advantageous for the additional sample to have a value that minimises the spatial frequency energy at the edge of the picture. In the special case where there are no high spatial frequency components close to the edge of the picture, for example a 'flat' image of equal-value pixels, then it is advantageous for the extra pixel to be equal to the values of its neighbours; and, if P is unity, this will be the case for both the higher-resolution and the lower-resolution image.

The implementation of an FIR filter involves the evaluation of products of pixel values and coefficients, and the accumulation of sums of these products. This processing may require a wider number range, represented by more bits than are used for the input and output sample values, so as to avoid overload. Similarly, the evaluation of equation [6] or [7] above may require high precision, especially if the respective divisors become small. These factors may limit the choice of the parameter P in a particular implementation. Values of P greater than unity are undesirable, as are values that give rise to small values of $(P - K_U)$, or of $(1 - K_D \cdot P)$. Experiments have suggested that a value of P a little less than unity is advantageous.

In the foregoing description, the invention is implemented by inputting the values of reflected pixels that are near the edge of the picture into the resampling filter twice; once at their respective positions and once at their reflected positions. Another way of achieving the same result is to modify the coefficients of the resampling filter in the edge regions.

Figure 9:
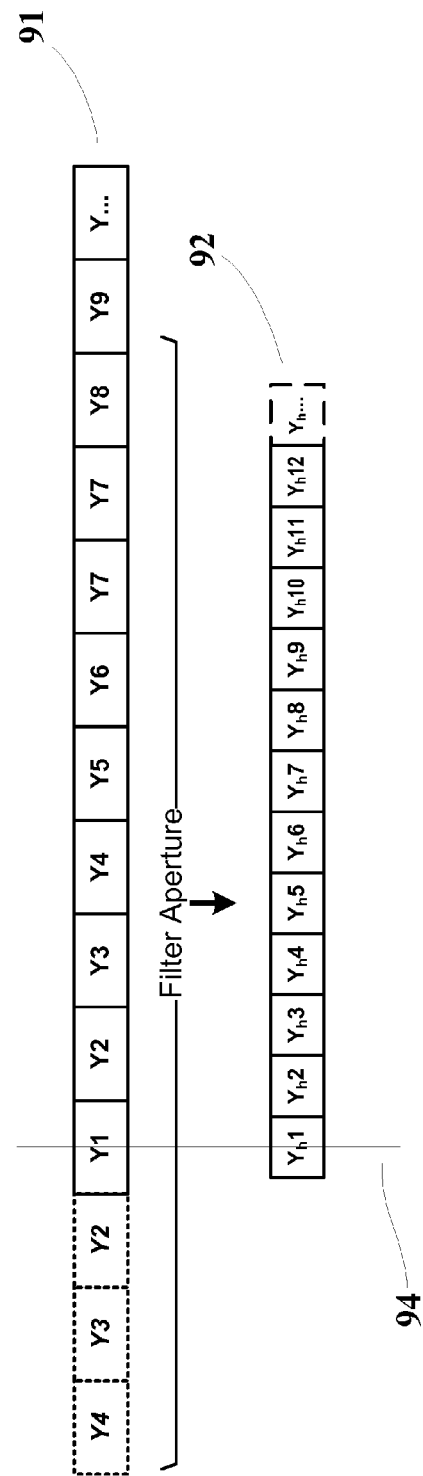
FIG. 9 shows the up-sampling of a higher-resolution sample from a set of lower-resolution samples according to an embodiment of the invention.

For example, FIG. 9 shows the up-sampling of the fifth sample of a set of higher-resolution samples (92), where the lower-resolution samples (91) are reflected about the position (94) of the first lower-resolution sample on a line. This up-sampled pixel can be evaluated (by inputting each reflected pixel twice) as:

$$Y_h 5 = K_{-4} \cdot Y4 + K_{-3} \cdot Y3 + K_{-2} \cdot Y2 + K_1 \cdot Y1 + K_2 \cdot Y2 + K_3 \cdot Y3 + K_4 \cdot Y4 + K_5 \cdot Y5 + \ldots + K_8 \cdot Y8$$

Where: $K_n$ are the filter coefficients.

Or, alternatively (by modifying filter coefficients):

$$Y_h 5 = K_1 \cdot Y1 + K_2' \cdot Y2 + K_3' \cdot Y3 + K_4' \cdot Y4 + K_2 \cdot Y5 + \ldots + K_6 \cdot Y8$$

Where:
$K_2' = K_2 + K_{-2}$
$K_3' = K_3 + K_{-3}$
$K_4' = K_4 + K_{-4}$
are modified coefficients.

When evaluating re-sampled pixels near the edge, only the 'overhanging' filter coefficients are modified. If the reflection point had been mid-way between filter-input samples, the coefficient $K_1$ of sample Y1 would also need to be modified The modification of the filter coefficients, rather than the filter input, reduces the required processing resource; filter coefficients inherently depend on the position of the re-sampled pixel that is being evaluated, and it is usually easier to include the modification of the coefficients in edge regions in the coefficient determination process, rather than to modify the selection of input pixels.

It is also possible to compute the contribution of the additional luminance pixel Y0 to re-sampled edge pixels by modification of the filter coefficients. In the case of up-conversion, the value of the extra input pixel L is proportional to $B_U$, which is a sum of filter contributions; these contributions (suitably weighted according to equation [2]) can be included in the filter coefficients that compute up-sampled pixels that have a contribution from L. And, similarly, in the case of down-conversion, the value of the additional pixel H is proportional to $B_D$ and converted pixels having contributions from H can have modified coefficients that include this contribution (suitably weighted according to equation [4]).

The invention can thus be implemented, without the need to store or process the additional sample, entirely by suitable modification of the coefficients of resampling filters whenever the filter aperture extends outside the edge of the image.

In the above descriptions of methods for deriving the value or the contribution of the additional sample, the example of a luminance sample was described; the same methods can be used for samples representing chrominance values, for example the samples C+ in FIG. 7.

Horizontal rescaling has been described, but the skilled person will appreciate that the principles described can equally be applied to vertical rescaling, and that two-dimensional rescaling can be carried out by cascading horizontal and vertical rescaling processes.

The skilled person will be able to apply the invention to any known FIR resampling filter and will appreciate that the filter characteristics, and in particular the size of the filter aperture will depend on the application, and may differ for chrominance and luminance rescaling filters.

The application of the invention to chrominance and luminance image samples has been described. The invention is equally applicable to other sampled image parameters or attributes, for example: density values, motion vector magnitudes, key signals or primary colour components.

The invention may be used even if different rescaling factors are applied to different constituent images, or if one or more constituent images are left at the respective original scale.

The invention claimed is:

1. A method of processing an image in an image processor, comprising the steps of:
   receiving input samples representing a spatially sampled attribute of an image having a width or height of N sample pitches;
   representing said image by N+1 rows or columns respectively of samples so that opposite image edges lie on sample positions;
   providing a symmetrical resampling filter having a plurality of filter-inputs defining a filter aperture and a filter-output and configured to take contributions from some or all of the filter-inputs to provide the filter-output; and
   resampling said samples with said resampling filter to provide output samples, in which the aperture extends beyond a said image edge for some output samples;
   wherein contributions to said resampling filter from positions outside the image are obtained by copying values from positions inside the image and wherein the said positions inside the image and the respective said positions outside the image are equidistant from an image edge;
   wherein the value of an image-edge sample input to a resampling filter is derived from the values of neighbouring input samples falling within the aperture of that resampling filter; and
   wherein the value of an image-edge sample input to a resampling filter is determined from a required ratio of the value of the said input sample value to the value of the corresponding co-located filter output sample.

2. A method according to claim 1 in which at least one of a plurality of sampled constituent images that respectively represent different attributes of a common image at different respective spatial sampling frequencies is rescaled.

3. A method according to claim 1 in which an image is rescaled horizontally and/or rescaled vertically.

4. A method according to claim 1 wherein first spatially sampled image attribute data at a lower sampling frequency is up-sampled and second sampled image attribute data at a higher sampling frequency is down-sampled wherein the combination of the said up-sampling with the said down-sampling is substantially without loss or distortion.

5. A method according to claim 1 in which the value of the said ratio is substantially equal to unity.

6. A method according to claim 1 in which the value of the said ratio is less than unity.

7. A method of processing an image in an image processor, comprising the steps of:
   receiving input samples representing a spatially sampled attribute of an image having a width or height of N sample pitches;
   representing said image by N+1 rows or columns respectively of samples so that opposite image edges lie on sample positions;
   providing a symmetrical resampling filter having a plurality of filter-inputs defining a filter aperture and a filter-output and configured to take contributions from some or all of the filter-inputs to provide the filter-output; and
   resampling said samples with said resampling filter to provide output samples, in which the aperture extends beyond an image edge for some output samples;
   wherein contributions to said resampling filter from positions outside the image are obtained by copying values from positions inside the image and wherein the said positions inside the image and the respective said positions outside the image are equidistant from an image edge;
   wherein an image having a width or height of N sample pitches is represented by N+1 rows or columns respectively of samples so that opposite image edges lie on sample positions; and
   wherein the value of an image-edge sample input to a resampling filter is chosen so that the value of the corresponding co-located filter output sample is zero.

8. A method according to claim 7 in which at least one of a plurality of sampled constituent images that respectively represent different attributes of a common image at different respective spatial sampling frequencies is rescaled.

9. A method according to claim 7 in which an image is rescaled horizontally and/or rescaled vertically.

10. A method according to claim 7 in which first spatially sampled image attribute data at a lower sampling frequency is up-sampled and second sampled image attribute data at a higher sampling frequency is down-sampled in which the combination of the said up-sampling with the said down-sampling is without loss or distortion.

11. Apparatus for resampling a spatially sampled attribute of an image comprising:
    a symmetrical FIR resampling filter configured so that contributions to the resampling filter from positions outside the image are obtained by copying values from positions inside the image;
    wherein the said positions inside the image and the respective said positions outside the image are equidistant from an image edge;
    wherein an image having a width or height of N sample pitches is represented by N+1 rows or columns respectively of samples so that opposite image edges lie on sample positions; and
    wherein the value of an image-edge sample input to a resampling filter is determined from a required ratio of the value of the said input sample value to the value of the corresponding co-located filter output sample.

12. Apparatus according to claim 11 in which at least one of a plurality of sampled constituent images that respectively represent different attributes of a common image at different respective spatial sampling frequencies is rescaled.

* * * * *